United States Patent [19]
Dixon

[11] Patent Number: 4,972,765
[45] Date of Patent: Nov. 27, 1990

[54] DOOR VENT

[76] Inventor: Alfred R. Dixon, 1200 W. Eleven Mile Rd., Royal Oak, Mich. 48067

[21] Appl. No.: 421,143

[22] Filed: Oct. 13, 1989

Related U.S. Application Data

[60] Continuation-in-part of Ser. No. 285,543, Dec. 15, 1988, Pat. No. 4,932,315, which is a division of Ser. No. 128,062, Dec. 3, 1987, Pat. No. 4,798,130.

[51] Int. Cl.$^5$ .............................................. B60H 1/24
[52] U.S. Cl. ...................................... 98/2.18; 137/855
[58] Field of Search .................. 98/2.18, 119; 137/855

[56] References Cited

U.S. PATENT DOCUMENTS

| | | | |
|---|---|---|---|
| 2,864,394 | 12/1958 | Hempel | 137/855 X |
| 2,881,795 | 4/1959 | Waldemaier et al. | 137/855 |
| 3,366,026 | 1/1968 | Herr et al. . | |
| 3,391,628 | 7/1968 | Ziegenfelder | 98/2.18 |
| 3,509,991 | 5/1970 | Hurst . | |
| 3,587,845 | 6/1971 | Wing . | |
| 3,814,124 | 6/1974 | Bell | 137/855 |
| 3,994,319 | 11/1976 | Airhart | 137/855 |
| 4,105,224 | 8/1978 | Radebaugh et al. . | |
| 4,150,186 | 4/1979 | Kazama . | |
| 4,171,397 | 10/1979 | Morrow . | |
| 4,377,968 | 3/1983 | Gerry | 98/95 X |
| 4,469,732 | 9/1984 | Isaksen et al. . | |
| 4,588,627 | 5/1986 | Isaksen et al. . | |
| 4,604,302 | 8/1986 | Isaksen et al. . | |
| 4,667,578 | 5/1987 | Hagenah . | |
| 4,696,848 | 9/1987 | Jones et al. . | |

FOREIGN PATENT DOCUMENTS

| | | |
|---|---|---|
| 167511 | 12/1981 | Japan . |
| 183308 | 10/1983 | Japan ..................................... 98/2.18 |

Primary Examiner—Harold Joyce
Attorney, Agent, or Firm—Basile and Hanlon

[57] ABSTRACT

A door vent having a vent formed to be slightly larger than a venting aperture in the automobile inner door panel. The vent has a second layer made of Mylar and a first layer made of polyvinylchloride or a nitrile, with an adhesive strip disposed on the top edge of the second layer. In a hinge-like manner, the vent allows air to pass in only one direction to vent the automobile interior.

6 Claims, 4 Drawing Sheets

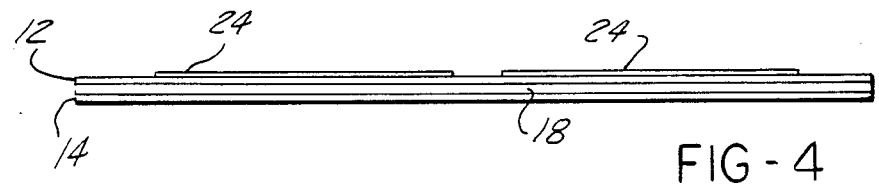
FIG-4
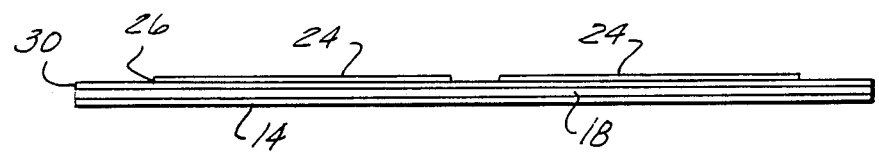
FIG-5
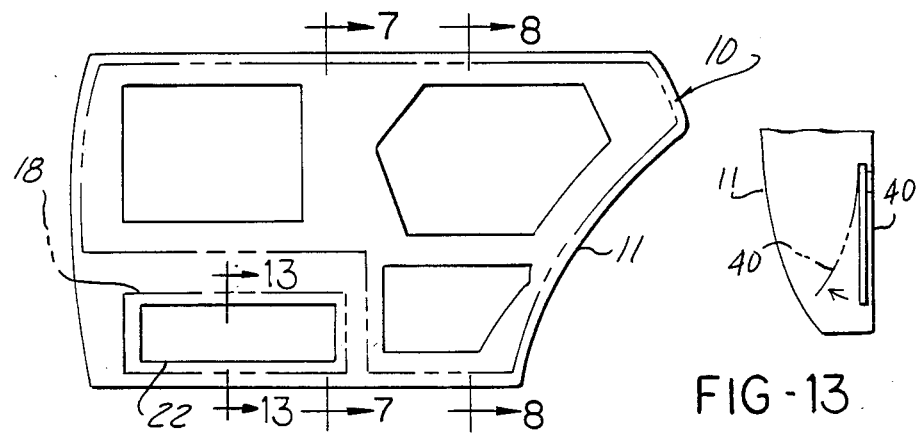
FIG-6
FIG-13
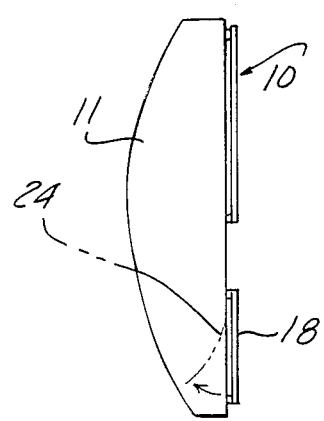
FIG-7
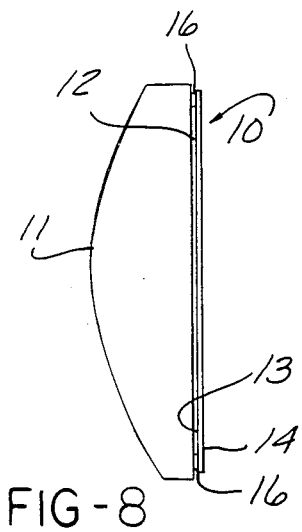
FIG-8

DOOR VENT

This appication is a continuation-in-part of U.S. Ser. No. 07/285,543, filed Dec. 15, 1988, now U.S. Pat. No. 4,932,315, which is a divisional of U.S. Ser. No. 07/128,062, filed Dec. 3, 1987, now U.S. Pat. No. 4,798,130.

BACKGROUND OF THE INVENTION

1. Field of the Invention

The present invention is concerned with a water deflector and vent sheet of the type used in automotive assembly for sealing the interior of the automobile body against ingress of moisture and air.

2. Description of the Relevant Art

Water deflecting sheets and venting apparatus are widely used in the automotive industry to protect the interior of the automobile body from ingress of moisture and to allow equalization of air pressure within the automobile body which is created by ventilation intake or door closings.

Generally, the deflector sheets are supplied without adhesive or other means of attachment. The sheets are generally waterproof, either due to the nature of the sheeting material or by application of surface coatings which, in effect, creates a composite material. During assembly of the automobile body, adhesive caulking or glue is applied to the perimeter of the body panel, and the deflector sheet is then pressed into position.

Prior door vents generally consist of relatively complex rigid frame assemblies fabricated from metal, plastic, or other like materials. The rigid frame is mounted on the inner door panel in a vertical position using fasteners such as rivets or screws. To prevent ingress of air and moisture, and to allow air passage out of the vehicle upon pressurization of the interior space, a flap of a flexible material such as rubber is hingedly mounted over air passages in the frame. This mounting method allows the flap to open in a hinge-like manner when pressure is increased within the vehicle, and to close, due to the weight of the flap, against angularly inclined ramps on the frame once interior pressure has been equalized. The rubber used in this prior design was very difficult to handle due to its lack of rigidity and lack of ability to retain its configuration.

The present invention is directed to door water deflectors and door vents of greatly simplified design which are of a flat configuration, and are supplied in stacks with adhesive already applied. The stacks are simple to peel apart and press into position on the automobile body panel.

The latest embodiment of the door vent is even simpler and more useful than the vent described in my earlier applications, cited above, in that this vent is of a one-piece construction having a waterproof layer on one side.

SUMMARY OF THE INVENTION

In accordance with the present invention, a door water deflector comprises sheets which are supplied with a polymer coating applied to both sides for waterproofing and other purposes. The side of the sheet facing the inner door panel has a black polymer coating which has been electrically treated to accept an adhesive application. The side of the sheet facing the interior of the automobile has a clear polymer coating which has been treated with a silicone coating which resists attraction of adhesive. An adhesive bead is subsequently applied to the electrically treated side of the sheet in a pattern which corresponds with the automobile panel to which the floor deflector sheet is to be applied. Since the adhesive will not adhere to the silicone treated poly coated side of the sheet, the clear poly side acts as a release paper which allows the sheets to be stacked, one upon another for ease of shipment of handling. The clear poly coating with silicone treatment acts as a release paper for the deflector sheet upon which it is stacked. The stacks of deflector sheets may be easily peeled apart and simply placed and pressed into position on the automobile body panel, eliminating the need for utilizing complex gluing apparatus or time consuming, the labor intensive hand operations on the assembly line.

Also in accordance with the present invention, a door vent comprises a flat frame board which may be of any suitable rigid material. The board may be prepared in a similar fashion to that described above, and vent holes through which air may pass from the interior of the vehicle are provided. A Mylar sheet, sized slightly larger than the vent holes in the board, is placed on the side of the board facing the door inner panel. The Mylar sheet is attached to the board along one edge only which allows the sheet to open and close over the vent holes in the board in a hinge-like manner. The Mylar has beneficial memory characteristics which the flaps used in the prior art do not have. The memory characteristic caused the flaps to remain flat against the frame board, thus providing an air tight seal whose performance far exceeds that of the prior art. The two-piece simplified assembly eliminates the complex frame and flap combination and its labor intensive assembly required in the prior art.

Added sealing capability may be provided through the application of a thin foam-like material between the board and the Mylar flap. The board may be supplied in stacks with adhesive already applied as described above. The board is attached to the body panel in a simple place-and-press technique which eliminates the need for complex attachment means such as screws, rivets, or other fasteners used in the prior art.

Another embodiment of the door vent comprises a vent formed to be slightly larger than a venting aperture in the inner door panel. The vent has a first layer made of a flexible thermoset material with the memory characteristics as described above, such as Mylar, and a second layer joined to the first layer. The second layer is made of a closed cell non-water absorbent damping material, such as polyvinylchloride or a nitrile. The vent further comprises means for fixedly attaching the top edge of one of the layers to the inner door panel such that the door vent covers the venting aperture.

This one-piece assembly is even more simplified than the above embodiment, and functions to vent the automobile interior in the same manner as the Mylar sheet attached to the frame board described above.

Another embodiment of the door vent comprises a frame formed to the size of a door panel aperture. The frame has a first and second side. A plurality of venting apertures are formed in each of the frame first and second sides. A sheet of flexible thermoset material having memory characteristics, such as Mylar, is fixed between the first and second sides of the frame. The sheet has a plurality of venting flaps formed in it. Means are provided for fixing the sheet between the first and second sides of the frame.

BRIEF DESCRIPTION OF THE DRAWINGS

Other objects and features of the invention will become apparent by reference to the following specification and to the drawings, in which:

FIG. 4 is a side view of FIG. 3 showing the relationship between the liner and the Mylar flaps;

FIG. 5 is an alternative edge view of FIG. 3 showing the foam layer disposed between the liner and the Mylar flap;

FIG. 6 is a front elevational view of a typical inner body panel with the door water deflector and vent apparatus of the present invention shown in phantom;

FIG. 7 is a schematic view taken on line 7—7 of FIG. 6 showing the vent apparatus installed on the inner door panel;

FIG. 8 is a schematic view taken on line 8—8 of FIG. 6 showing the water deflector installed on the inner door panel;

FIG. 13 is a schematic view taken on line 13—13 of FIG. 6 showing the second embodiment of the door vent installed on the inner door panel.

DESCRIPTION OF THE PREFERRED EMBODIMENT

Figure 1:
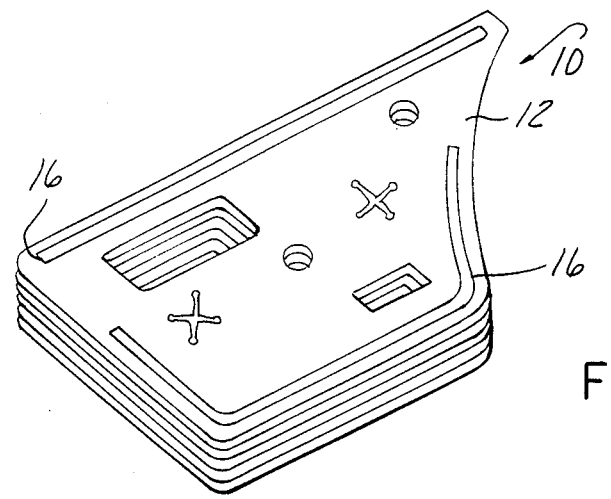
FIG. 1 is a perspective view of a stack of door water deflectors of the present invention with adhesive applied thereto.
Figure 2:
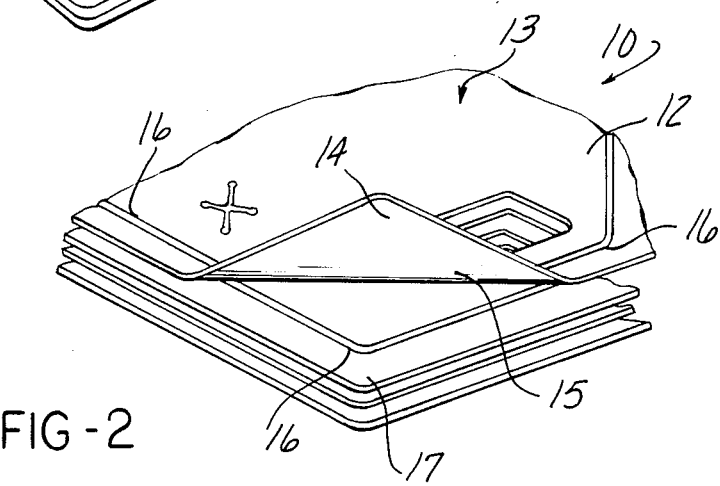
FIG. 2 is a perspective view of an enlarged section of FIG. 1 showing a door water deflector partially removed from the stack revealing the release coating layer.

In FIGS. 1 and 2 there is shown a typical example of a first embodiment of the present invention. The door water deflector, designated generally as 10, is made of suitable liner material which is cut to match the dimensions of each particular installation. The liner material may be of a polymer sheeting or of a layered polymer paper sheeting. The deflector 10, when installed in position on the inner side of an automobile body panel 11, as shown in phantom in FIG. 6, will cover all holes in the inner panel to prevent the ingress of moisture and air.

When the layered polymer-paper sheeting is the preferred embodiment, a polymer coating 12 is applied to a first side 13 of the deflector 10, which will contact the inner panel 11 of the automobile when installed. In a preferred embodiment, the polymer coating is a 10# black poly. This is a deposition specification which indicates that 10 pounds of polymer is deposited per 3,000 square feet of paper liner. The polymer coating 12 effectively waterproofs the paper deflector 10 to protect it from moisture which collects on the interior of the automobile panel 11 to which it is attached.

The first side 13 is treated by a process which allows the poly surface to adhere to a hot melt pressure sensitive adhesive. In a preferred embodiment, the treatment is an electrical discharge treatment referred to as a Corona treatment. The results of the treatment are measured in Dynes; with a preferred embodiment having a Dyne level in a range between 35 and 44. The treatment is not required to be applied to the entire inner poly layer, but must at least cover areas where adhesive is to be applied.

An outer poly layer 14 facing the interior of the automobile body, as seen in FIG. 2, is applied to a second side 15 of the deflector 10 when the layered polymer-paper sheeting is used. In a preferred embodiment, the outer poly coating comprises a 10# polyethylene. The outer poly coating 14 is not treated to accept an adhesive, but, conversely, this coating 14 is treated with silicone which acts as a release coating on the liner. The treatment is not required to be applied to the entire outer poly layer, but must at least correspond to areas where adhesive is applied on the inner poly layer. In a preferred embodiment, the second side 15 has a release specification of less than 30 gm on the Kile test which determines the force required to peel the layers apart at a specified standard pull rate.

To the inner side 13 is applied, on areas treated to accept adhesive, a bead of pressure sensitive adhesive 16. The adhesive 16 is applied to the deflector 10 in a predetermined pattern which will match the automobile panel on which the deflector 10 will be applied.

The three dimensional nature of the adhesive bead gives the adhesive depth, enabling it to mold to the surface of the body panel. This characteristic allows a complete watertight seal should the water deflector become wrinkled prior to installation, unlike flat adhesives (i.e., sticky surfaces) which will only contact the body panel if the deflector is completely flat.

A plurality of deflector sheets 10 to which the pressure sensitive adhesive 16 has been applied are stacked one on top of another in the configuration shown in FIGS. 1 and 2. Release paper is not required between the deflector sheets 10, since the silicone treated side 15, as seen in FIG. 2, acts as the release surface for the deflector sheet 17 with which it is in contact. A deflector sheet 10 is readied for application by peeling a sheet from the top of a stack, as seen in FIG. 2. The three dimensional characteristics of the adhesive bead allows for easy peeling since a space is created between each sheet. Due to the release characteristics of the second side 15, the adhesive 16 on the next sheet 17 in the stack will remain intact and will not be attached to the sheet being lifted. Once a liner 10 is separated from the stack, it may be pressed into place as shown in phantom in FIG. 6 and in FIG. 8.

The supplying of door water deflectors in this fashion eliminates the need for gluing equipment and time consuming, labor intensive hand operations on the assembly line and saves time in positioning and attaching the liners.

Figure 3:
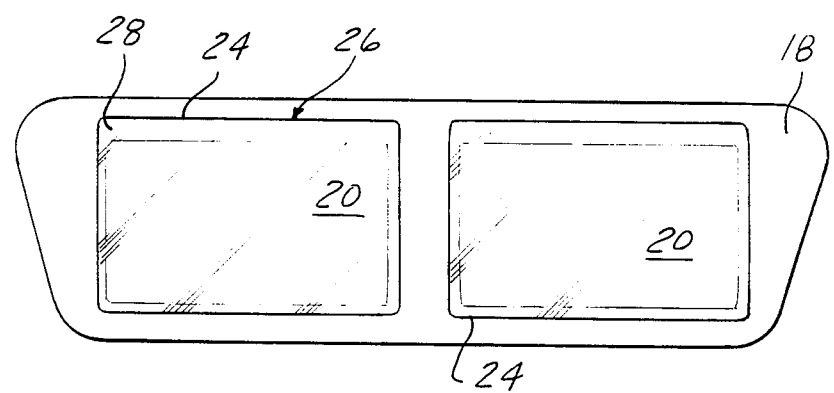
FIG. 3 is a front elevational view of a door vent with Mylar flaps applied.

A second embodiment of the above invention comprises a door vent to be applied to the inside door panel of an automobile body as is shown in FIGS. 3 through 5. The door vent has a frame 18 which is fabricated from a flat composite board or other similar material. The board is cut to match the dimensions of a particular installation and has apertures 20 formed therein to allow the passage of air. The vent, when installed, will cover a body aperture 22 formed in the inner door panel, as shown in FIG. 6, used for venting the automobile interior.

The frame board may be treated in a fashion similar to the above deflector sheet embodiment. A black polymer coating 12 is applied to the surface of the frame which will contact the automobile body panel and a second polymer coating 14 is applied to the side of the vent frame which is to face the interior of the automobile. The black polymer coating 12 will receive a similar Corona treatment which will allow it to adhere to an adhesive applied to the surface. Similarly, the second polymer coating 14 will receive a silicone treatment, giving it the release characteristics desired.

In another embodiment, a release paper may be applied over the adhesive bead, thus forgoing the silicone treatment. Fixedly attached to the vent frame are single precut Mylar sheets 24 which are cut to be slightly larger than the air passage apertures 20 provided in the frame. One Mylar sheet 24 may be provided to cover the entire vent frame or multiple sheets may be provided to cover each air passage aperture 20. The Mylar sheets 24 are provided with a strip 26, at which point the Mylar sheets may be attached to the frame. Attachment means may consist of an adhesive, a heat seal, a dielectric seal, a sonic weld or other comparable means. The seal 28 is applied along the top edge of the Mylar sheet so that only one edge of the sheet will be restrained. The Mylar sheets 24 are then operable in a hinge-like manner to allow air passage through the air passage apertures 20 in the vent frame 18. Because the Mylar sheets 24 are larger than the air passage apertures 20, the flaps allow air passage through the vent in only one direction. Upon equalization of air pressure on both sides of the vent, the Mylar sheet 24, due to the memory characteristics of Mylar sheeting, will be returned to its original flat position over the vent aperture 20 and will prevent air passage through the vent in a second direction in to the interior of the automobile.

As can be seen in FIG. 5, a second embodiment of the flap may be provided with a foam layer 30 positioned between the vent frame 18 and the Mylar sheet 24. The foam layer 30 acts to increase the sealing capability of the Mylar sheet 24 against vent frame 18.

The vent of the present invention which utilizes a die cut frame board and die cut Mylar sheet in place of the molded plastic frames of complex shape with separate closures and complex attaching means greatly simplifies the production of the vent, thus greatly reducing cost while simultaneously increasing reliability through the memory characterisitics of the Mylar.

Once the Mylar sheets 24 have been applied to the vent frame 18, adhesive may be applied to the door vent assembly in a manner similar to the described for the water deflector above. Because the black polymer layer 12 has been Corona treated to accept adhesive, and the second polymer layer 14 has been silicone treated for releasability, the vent assemblies are stackable with the second polymer layer 14 acting as a release surface for the board upon which it is stacked. In the alternative embodiment, a release paper is used over the adhesive bead to aid in peeling the vents apart. The vent assembly is easily applied to the automobile body panel 11 by removing one vent assembly from the stack and pressing the vent assembly in place in its designated position on the door or body panel as shown in phantom in FIG. 6 and in FIG. 7.

Figure 11:
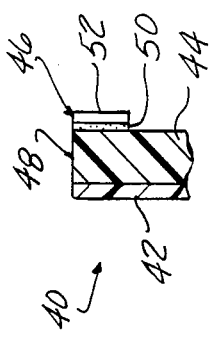
FIG. 11 is a cross-sectional view taken along line 11—11 of FIG. 9, enlarged to show detail.
Figure 9:
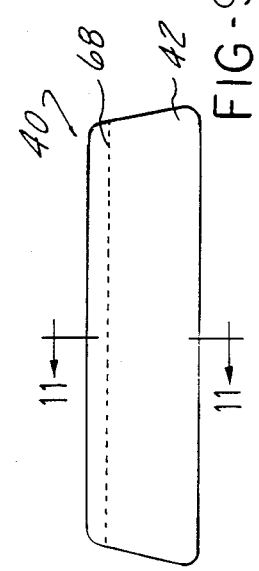
FIG. 9 is a front elevational view of a second embodiment of the door vent.

A second embodiment of the door vent is shown in FIGS. 9 and 11. This embodiment comprises a vent 40 formed to be slightly larger than a venting aperture 22 in an automobile inner door panel 11 as shown in FIG. 6. The vent 40 has a first layer 42 joined to a second layer 44. Second layer 44 is made of a flexible thermoset material having memory characteristics, namely a polyester film with very high tensile strength, such as Mylar. First layer 42 is made of a closed cell non-water absorbent damping material, such as a foam thermoplastic or rubber. Examples of this would be polyethylene, polyvinylchloride (PVC) or a nitrile. In the preferred embodiment, Black Volara, a foam polyethylene, is used as this damping material. It is to be understood that this order may be reversed, i.e. first layer 42 may be made of Mylar, with second layer 44 being made of PVC.

The advantage in using the Mylar/Black Volara combination is that, due to the memory characteristics of the Mylar, the vent 40 functions to vent the automobile interior by allowing air passage in only one direction, as described above. The Black Volara acts as a water barrier, as well as damping the reed force potential. This is what causes a fluttering noise as the Mylar sheet 24, shown in FIG. 7, moves back and forth with the air passage. This fluttering noise can be annoying to passengers in the automobile, and the Black Volara dampens this noise. A hingepoint perforation 68 may be formed on first layer 42 in order to reduce springback.

As best seen in FIG. 11, vent 40 further comprises means 46 for fixedly attaching the top edge 48 of second layer 44 to the inner door panel 11 such that vent 40 covers venting aperture 22. In the preferred embodiment, attaching means 46 comprises an adhesive strip 50 covered by release paper 52, as can best be seen in FIG. 11. The adhesive strip 50 with release paper 52 functions as described in earlier embodiments. Further attaching means 46 may comprise stapling, heat staking or pinning.

Figure 10:
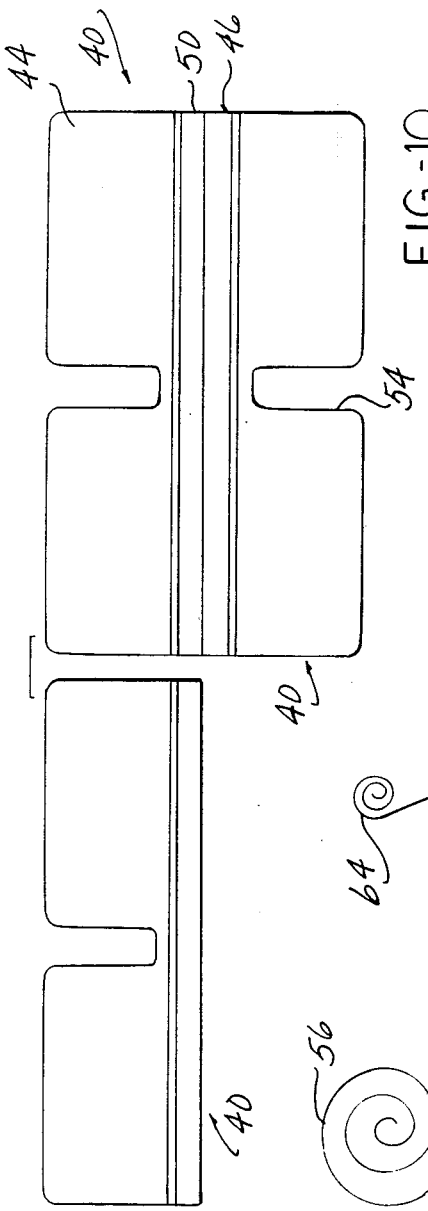
FIG. 10 is a rear view of three door vents of a third embodiment showing adhesive applied to the top edges of the vents' second faces.

Vent 40 functions in the same manner as Mylar sheets 24 described in earlier embodiments. Thus, the venting of the automobile is achieved with all the benefits of the Mylar memory characteristics. In addition, vent 40 gives the added benefit of the water resistant, damping effects of the Black Volara, as well as being an even simpler design since there is no need for a frame board. Vent 40 may readily be form cut from a die. As seen in FIG. 10, a space 54 may be formed in a vent 40, thus allowing one vent 40 to cover two apertures 22 in an inner door panel 11.

Figure 12:
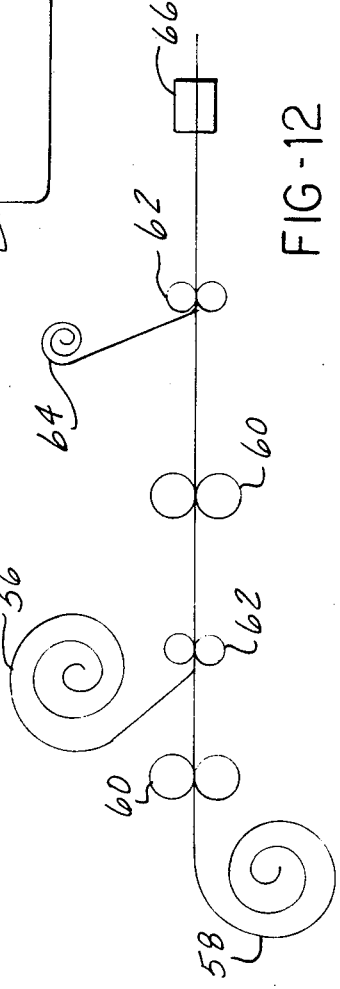
FIG. 12 is a schematic view of a method for making the door vent of FIG. 9.

A method for making vent 40 is shown in FIG. 12. The first step of the method is to adhere the polyethylene 56 to the Mylar 58. These two materials are rolled together by hot melt roll applicators 60 and pinch rolls 62 into a thin sheet of the desired width. Adhesive strip 64 is applied to the top edge of either the PVC damping material 56, or the Mylar 58, and release paper is applied on top of the adhesive 64. The resulting door vent is then cut into the desired shape by a die 66. The vents 40 may be cut one at a time, or any number at a time, in any desired shape or configuration, as shown in FIG. 10.

Figure 14:
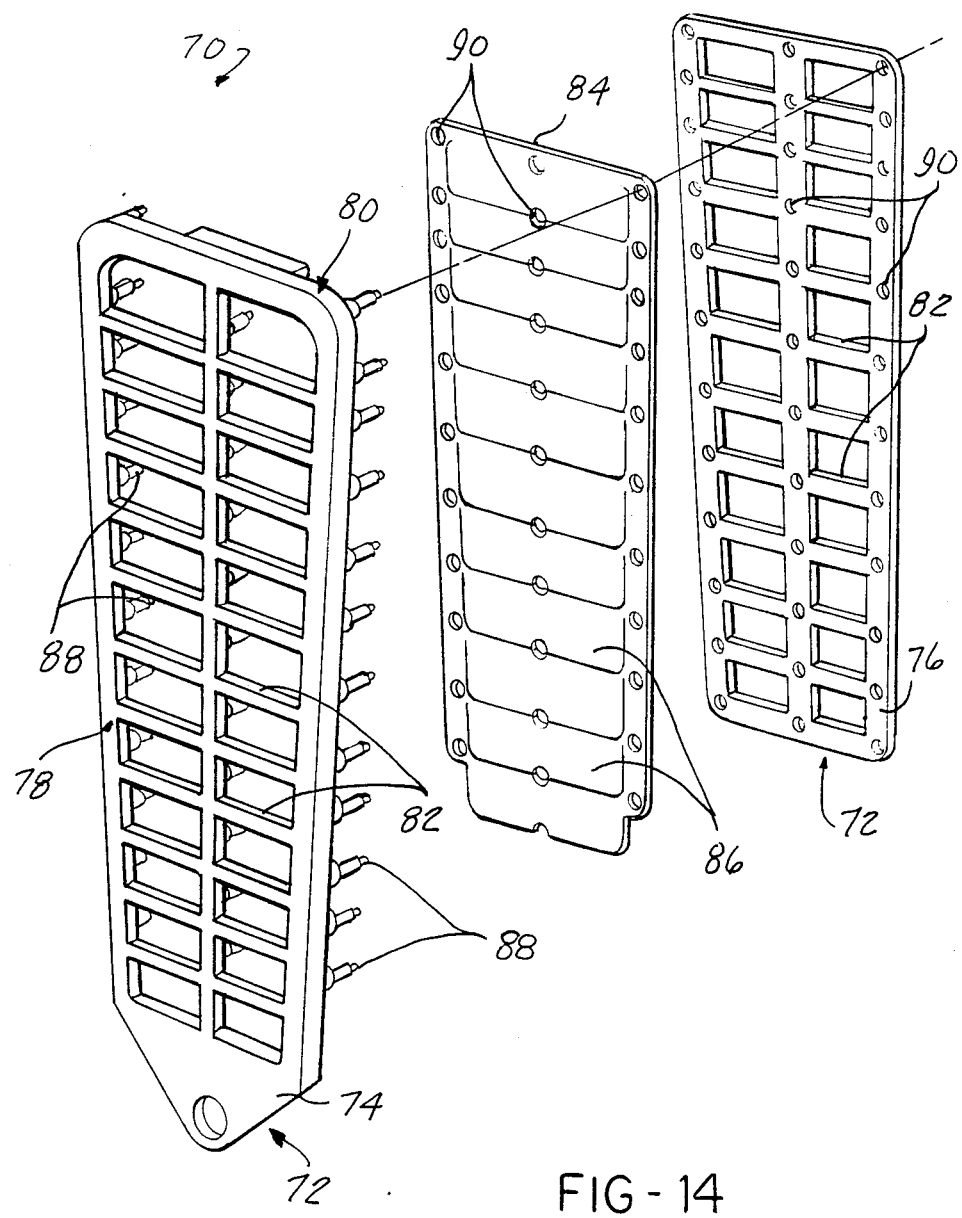
FIG. 14 is an exploded perspective view of a further embodiment of the door vent.

Another embodiment of the door vent is designated 70 in FIG. 14. Vent 70 can be installed in the conventional area (not shown) on the inner edge of a car door underneath the locking mechanism of the door, and perpendicular to the door body. Door vent 70 comprises a frame 72 having a first side 74 and a second side 76. Frame 72 may be made of any suitable material, including polypropylene. First side 74 has a front 78 and a back 80. Frame 76 is made from polypropylene or any other suitable material.

A plurality of venting apertures 82 are formed in each of the frame first and second sides 74, 76 respectively. A sheet 84 of flexible thermoset material with memory characteristics, such as Mylar, is then fixed between first side 74 and second side 76 of frame 72. Sheet 84 has a plurality of venting flaps formed therein. Venting flaps 86 are operable in a hinge-like manner to move from a closed position, where the venting flaps are closed over the venting apertures 82, to an open position where the venting flaps allow air passage in only one direction when the air pressure is increased within the automobile. The direction the air moves in is first through venting apertures 82 in second side 76 of the frame 72, then through venting flaps 86 in flexible sheet 84, and then through venting apertures 82 in first side 74 from the back 80 of first side 74 and out through the front 78 of first side 74. Due to the memory characteristics of the Mylar, venting flaps 86 are returnable to the closed position to prevent air passage in a second direction. Flexible sheet 84 takes the place of the rubber used in the prior art. In addition to the beneficial memory characteristics, since flexible sheet 84 is more rigid than rubber, it is also much easier to handle.

Means are provided for fixing flexible sheet 84 between first side 74 and second side 76 of frame 72. This fixing means may comprise a plurality of projections 88 formed on back 80 of first side 74 of frame 72. A plurality of projection receiving apertures 90 are formed in both flexible sheet 84 and second side 76 of frame 72. Means for attaching projections 88 to projection receiving apertures 90 are provided. This attaching means may comprise any suitable means, including heat staking.

Various embodiments of the invention have been described in detail above in relation to door water deflectors and vent assemblies. It will be apparent to those skilled in the art that the disclosed embodiments may be modified; therefore, the foregoing description is to be considered exemplary, rather than limiting, and the true scope of the invention is that defined in the following claims.

What is claimed is:

1. An automobile door vent for an automobile inner door panel having a venting aperture formed therein, the door vent comprising:
    a vent formed to be slightly larger than the venting aperture in the automobile inner door panel, the vent having first and second joined layers, one of the first and second layers being made of a flexible thermoset material having memory characteristics, the other of the first and second layers being made of a closed cell non-water absorbent damping material; and
    means for fixedly attaching the top edge of one of the layers to the inner door panel such that the door vent covers the venting aperture;
    wherein the vent is operable in a hinge-like manner to move from closed position where the vent is closed over the venting aperture, to an open position where the vent allows air passage in only one direction through the venting aperture when the air pressure is increased within the automobile, and wherein the vent is returnable to the closed position to prevent air passage in a second direction.

2. The door vent as defined in claim 1 wherein the first layer is made of polyvinylchloride.

3. The door vent as defined in claim 1 wherein the second layer is made of Mylar.

4. The door vent as defined in claim 1 wherein the attaching means comprises an adhesive strip with release paper covering the strip.

5. An automobile door vent for an automobile inner door panel having a venting aperture formed therein, the door vent comprising:
    a vent formed to be slightly larger than the venting aperture in the automobile inner door panel, the vent having first and second layers, the first layer being made of polyvinylchloride, the second layer being made of Mylar; and
    an adhesive strip disposed on the top edge of the second layer for fixedly attaching the second layer to the inner door panel such that the door vent covers the venting aperture;
    wherein the vent is operable in a hinge-like manner to move from a closed position where the vent is closed over the venting aperture, to an open position where the vent allows air passage in only one direction through the venting aperture when the air pressure is increased within the automobile, and wherein the vent is returnable to the closed position to prevent air passage in a second direction.

6. A method for making automobile door vents for an automobile inner door panel having a venting aperture formed therein, the method comprising the steps of:
    adhering a closed cell, non-water absorbent damping material to a flexible thermoset material having memory characteristics;
    rolling the resultant material into a thin sheet;
    applying adhesive to the top edge of one of the damping material and the flexible thermoset material;
    applying release paper to the adhesive; and
    then cutting the resulting door vent into a desired shape such that the vent is slightly larger than the venting aperture in the automobile inner door panel.

* * * * *